United States Patent [19]
Chambers et al.

[11] Patent Number: 5,745,552
[45] Date of Patent: Apr. 28, 1998

[54] LINE COMMUNICATION SYSTEMS INCORPORATING MAINS ELECTRICITY CONDUCTORS FOR COMMUNICATIONS

[75] Inventors: Gordon William Chambers, Romsey; Alexander Schroder Philip, Wimborne, both of England

[73] Assignee: GPT Limited, Coventry, England

[21] Appl. No.: 562,226

[22] Filed: Nov. 22, 1995

[30] Foreign Application Priority Data

Nov. 24, 1994 [GB] United Kingdom .................. 9423701
Dec. 8, 1994 [GB] United Kingdom .................. 9425039

[51] Int. Cl.$^6$ ..................................................... H04M 11/00
[52] U.S. Cl. ............................ 379/61; 379/66; 455/33.1
[58] Field of Search ............................ 379/61, 56, 66; 455/3.1, 3.3, 6.1, 20; 340/310.01, 310.06; 359/171; 307/3; 356/376

[56] References Cited

U.S. PATENT DOCUMENTS

| 5,051,720 | 9/1991 | Kittirutsunetorn | 379/66 |
| 5,066,939 | 11/1991 | Mansfield, Jr. | 379/66 |
| 5,067,817 | 11/1991 | Glenn | 356/376 |
| 5,623,531 | 4/1997 | Nilssen | 379/56 |

FOREIGN PATENT DOCUMENTS 0 317 768 A1  5/1989  European Pat. Off. .
2 265 215     6/1992  United Kingdom .

*Primary Examiner*—Dwayne Bost
*Assistant Examiner*—Keith Ferguson
*Attorney, Agent, or Firm*—Hill, Steadman & Simpson

[57] ABSTRACT

A line communication system for linking a plurality of telephone subscribers to a public telephone exchange, wherein the subscribers are each located within the same general area, and wherein each subscriber is fed from the same mains electricity sub-station with mains electricity is provided. The line communication system provides subscriber apparatus which includes a cordless telephone (CT) handset and a frequency convertor for each subscriber. The handset is hard-wired to the mains electricity supply conductors via the frequency convertor so that CT signals at UHF are down-converted to HF for transmission through the mains electricity conductors. A CT base station is connected to the public telephone exchange. The CT base station is connected to the mains electricity supply conductors via a further frequency convertor for HF line communication purposes. A control matrix is provided in operative association with the base station, which serves to associate an address (corresponding to a telephone number) for each subscriber as recognized by the public telephone exchange with corresponding channels assigned by the CT protocol to each subscriber. Thus, the public telephone exchange and the subscribers are placed in mutual two-way communication and that calls are correctly routed and billed.

8 Claims, 5 Drawing Sheets

LINE COMMUNICATION SYSTEMS INCORPORATING MAINS ELECTRICITY CONDUCTORS FOR COMMUNICATIONS

BACKGROUND OF THE INVENTION

This invention relates generally to line communication systems and more particularly to such systems which utilize mains electricity conductors to carry signals for communication purposes.

SUMMARY OF THE INVENTION

According to one aspect of the present invention, a line communication system for linking a plurality of telephone subscribers to a public telephone exchange, wherein the subscribers are each located within the same general area, and wherein each subscriber is fed from the same mains electricity sub-station with mains electricity is provided. The line communication system has subscriber apparatus which includes a cordless telephone (CT) handset and a frequency convertor for each subscriber. The handset is hard-wired to the mains electricity supply conductors via the frequency convertor so that CT signals at UHF are down-converted to HF for transmission through the mains electricity conductors. A CT base station is connected to the public telephone exchange. The CT base station is connected to the mains electricity supply conductors via a further frequency convertor for HF line communication purposes. A control matrix is provided in operative association with the base station. The control matrix serves to associate an address (corresponding to a telephone number) for each subscriber as recognized by the public telephone exchange with corresponding channels assigned by the CT protocol to each subscriber. Thus, the public telephone exchange and the subscribers are placed in mutual two-way communication.

By utilizing a CT handset for each subscriber, as well as a CT base station remotely located to serve them, a system is provided in which a considerable saving of dedicated telephone lines is effected, as well as a reduction in complexity of the public telephone exchange switching facilities. This latter feature is afforded since a part of the switch function which would otherwise be provided at the public telephone exchange is provided by the CT base station. In addition, because all subscribers served by a base station will not statistically require line usage at the same time, further economies may result. For example, a base station serving 150 domestic subscribers may require only 12 telephone exchange lines in order to provide a good grade of service. Also, the frequency convertors used in the subscriber apparatus and in the base station may be similar.

In a system according to the above aspect of the invention, by using frequency convertors for each CT handset and the CT base station, an existing CT handset design such as a CT2 handset can be used without modification in combination with a corresponding CT2 base station. However, in accordance with an alternative embodiment of the invention, the telephone signals are outputted directly at HF.

According to this alternative embodiment of the invention, a line communication system for linking a plurality of telephone subscribers to a public telephone exchange, wherein the subscribers are each located within the same general area, and wherein each subscriber is fed from the same mains electricity sub-station with mains electricity, comprises subscriber apparatus which includes a modified CT handset adapted to provide output signals at HF. One such modified handset is provided for each subscriber. The handsets are hard-wired to the mains electricity supply conductors so that CT signals are transmittable through the mains electricity conductors. A modified CT base station is connected to the public telephone exchange. The modified CT base station is connected also to the mains electricity supply conductors so as to receive HF signals transmitted from the subscribers. A control matrix is provided in operative association with the base station, which serves to associate an address (corresponding to a telephone number) for each subscriber as recognized by the public telephone exchange with corresponding channels assigned by CT protocol to each subscriber. Thus, the public telephone exchange and the subscribers are placed in mutual two-way communication and calls are correctly routed and billed.

A CT handset or base station used in accordance with either of the foregoing embodiments of the present invention may advantageously correspond to a cordless telephone standard (or selected parts thereof) such as the Common Air Interface (CAI) standard as specified by the European Telecommunications Standards Institute (ETSI) and known as CT2, or the Digital European Cordless Telecommunications (DECT) standard as also specified by ETSI. For data or broadband applications, the standard channel usage is abandoned in favor of a more efficient filling format which requires less 'overhead' per channel and releases pay-load bits (by using a common overhead for a group of concatenated channels forming the broadband bearer). Conveniently, the modified CT base station may be installed at an electricity sub-station located remotely from the subscribers. Alternatively, however, the CT base station may be located in close proximity to one of the subscribers.

Using existing CT protocols, there is a limit to the number of subscribers which can be served from each base station. The number is determined in accordance with the particular cordless telephone protocol used, e.g. CT2 or DECT. However, by using a plurality of different HF frequency bands, one band for each of a plurality of different subscriber groups, the number of subscribers served can be substantially increased.

Thus, a plurality of base stations may be used, each serving a different group of subscribers and each base station is arranged to use a different HF frequency band. Thus, contemporaneous use of the same electricity supply conductors is facilitated.

Although systems according to the present invention are eminently suited for telephone voice communication, it is envisaged that the systems may be used for data transmission which may include video systems, fax systems or data communication systems for in-home entertainment, for example.

One embodiment of the invention is described below, by way of example only, with reference to the accompanying drawings.

DETAILED DESCRIPTION OF THE PREFERRED EMBODIMENTS

Figure 1:
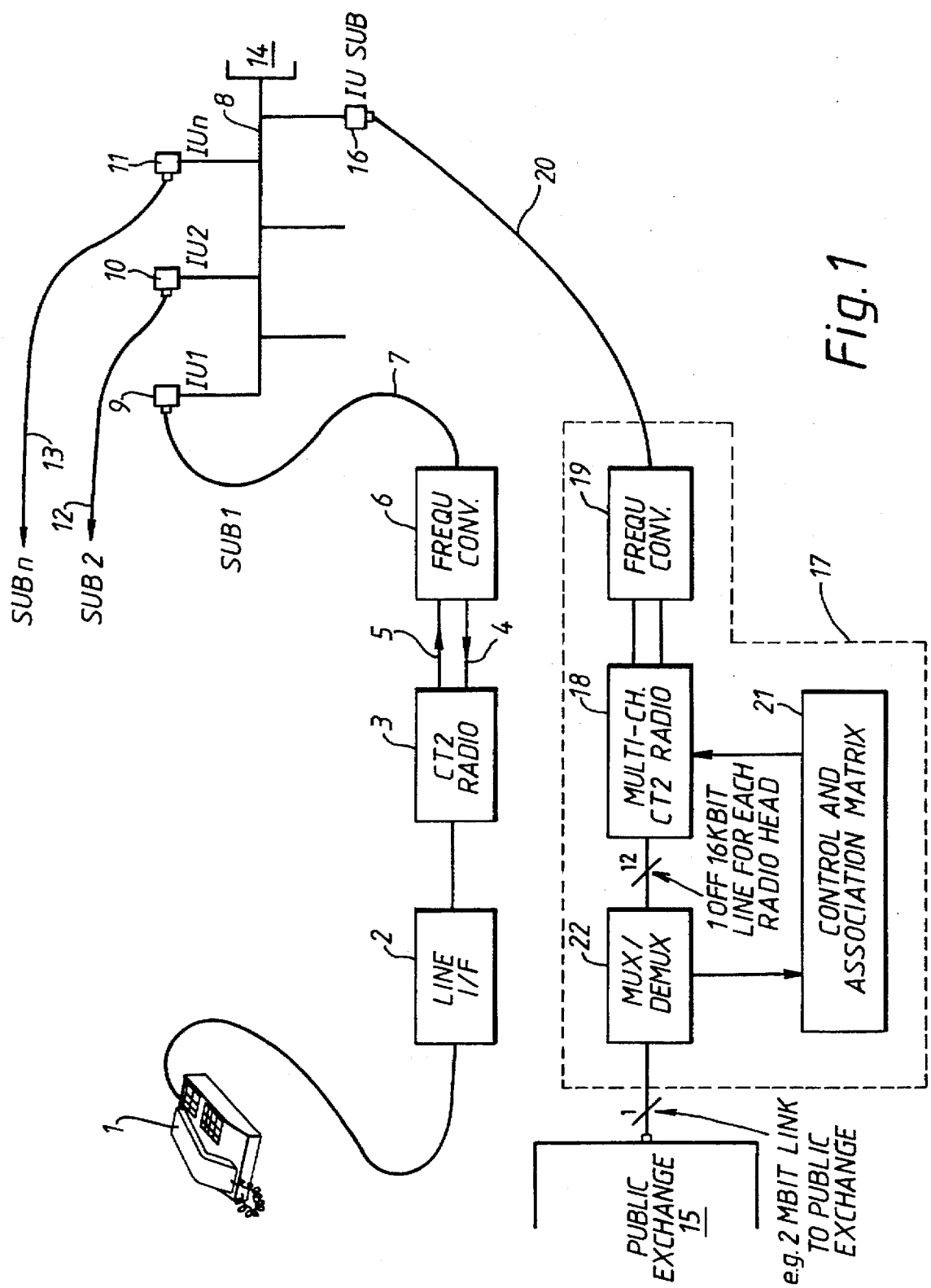
FIG. 1 is a block schematic diagram of a line communication system of the present invention.

Referring now to FIG. 1, a line communication system comprises a subscriber's telephone handset 1, which is coupled via a line interface unit 2 to a CT2 radio unit 3. Input signals to the CT2 radio unit 3 on a line 4 and output signals from the CT2 radio unit 3 on a line 5, which would normally be radiated through the air at UHF in the CT2 radio frequency operating band (which lies between 862 MHz and 866 MHz), are fed to a frequency convertor 6. The frequency convertor 6 converts the CT2 frequency band so that it is centered on 8 MHz (i.e. the 4 MHz CT2 bandwidth lies between 10 MHz and 6 MHz). Although an 8 MHz center frequency has been selected in the present example, it will be apparent that other center frequencies in the HF band would serve satisfactorily for the same purpose. Line communication signals are fed from the frequency convertor 6 via a line 7 to the conductors 8 of a mains electricity supply network via an interface unit 9. The interface unit 9 includes isolating components by means of which the telephone apparatus, including the frequency convertor 6, are isolated from the mains electricity supply voltage. Similar interface units 10 and 11 are shown which communicate via lines 12 and 13, respectively, with other subscribers. The interface units 9, 10 and 11 are fed with mains electricity from a substation 14.

In order to provide a telephone communication link between the subscriber telephone handset 1 and another subscriber via a public telephone exchange 15, the public exchange 15 is linked to the mains electricity supply via an interface unit 16 and a base station 17 as shown within a broken line. The base station 17 (as shown within the broken line) includes a multichannel CT2 radio base station 18 which is fed from the interface unit 16 via a frequency convertor 19. The frequency convertor 19 converts HF signals transmitted from telephone subscribers to UHF signals via the electricity supply conductors 8 and the interface unit 16 on a line 20. The UHF signals are applied to the CT2 radio base station 18. The radio channel for a given link is selected automatically by the CT2 protocol. To associate subscribers identified by the CT2 radio protocol with telephone lines as recognized by the public exchange 15, a control and association matrix 21 is provided which includes a look-up table for facilitating the necessary association between the CT2 designation and public exchange addresses (telephone numbers).

The frequency convertor 6 and the frequency convertor 19 may both be fabricated using any well established frequency changing technique. One such frequency convertor suitable for performing a frequency conversion operation as performed by the frequency convertor 6 will now be described with reference to FIG. 4.

Figure 4:
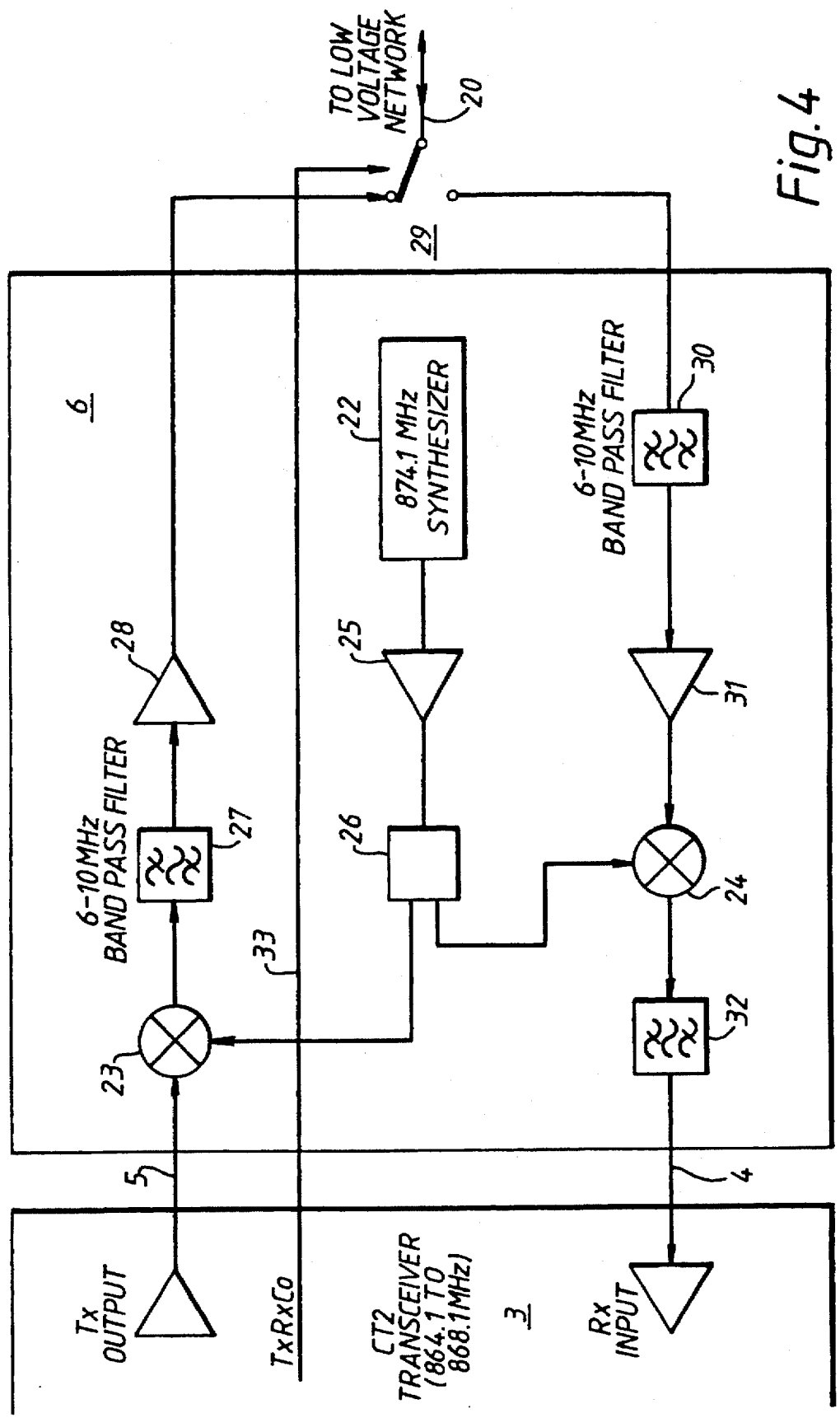
FIG. 4 is a block schematic diagram including a frequency convertor which forms a part of the system of the present invention shown in FIG. 1.

Referring now to FIG. 4, wherein the lines 4, 5 and 20 shown in FIG. 1 are also included, the frequency convertor 6 comprises a synthesizer 22 which operates at 874.1 MHz. The synthesizer 22 is arranged to feed a pair of mixers 23 and 24 via an amplifier 25 and a signal splitter 26. The mixer 23 is fed also via line 5 from the CT2 radio unit 3 with transmitted signals in the CT2 UHF band to produce HF output signals from the mixer 23. The HF output signals are fed via a 6–10 MHz band pass filter 27 and an amplifier 28 to the line 20 via a TX/RX switch 29. The mixer 24 is also fed via a 6–10 MHz band pass filter 30 and an amplifier 31 with HF signals from the switch 29 when it is appropriately set to produce UHF signals. The UHF signals are fed to the CT2 radio 3 on the line 4 via a UHF band pass filter 32.

Control of the contacts of the TX/RX switch 29 is effected via a line 33 in accordance with whether a transmit or receive function is present within the CT2 radio unit 3. It will be appreciated that the frequency convertor 19 operates in substantially the same manner as hereinbefore described with reference to the frequency convertor 6 to produce a similar result, and may therefore comprise substantially identical circuitry.

Figure 2:
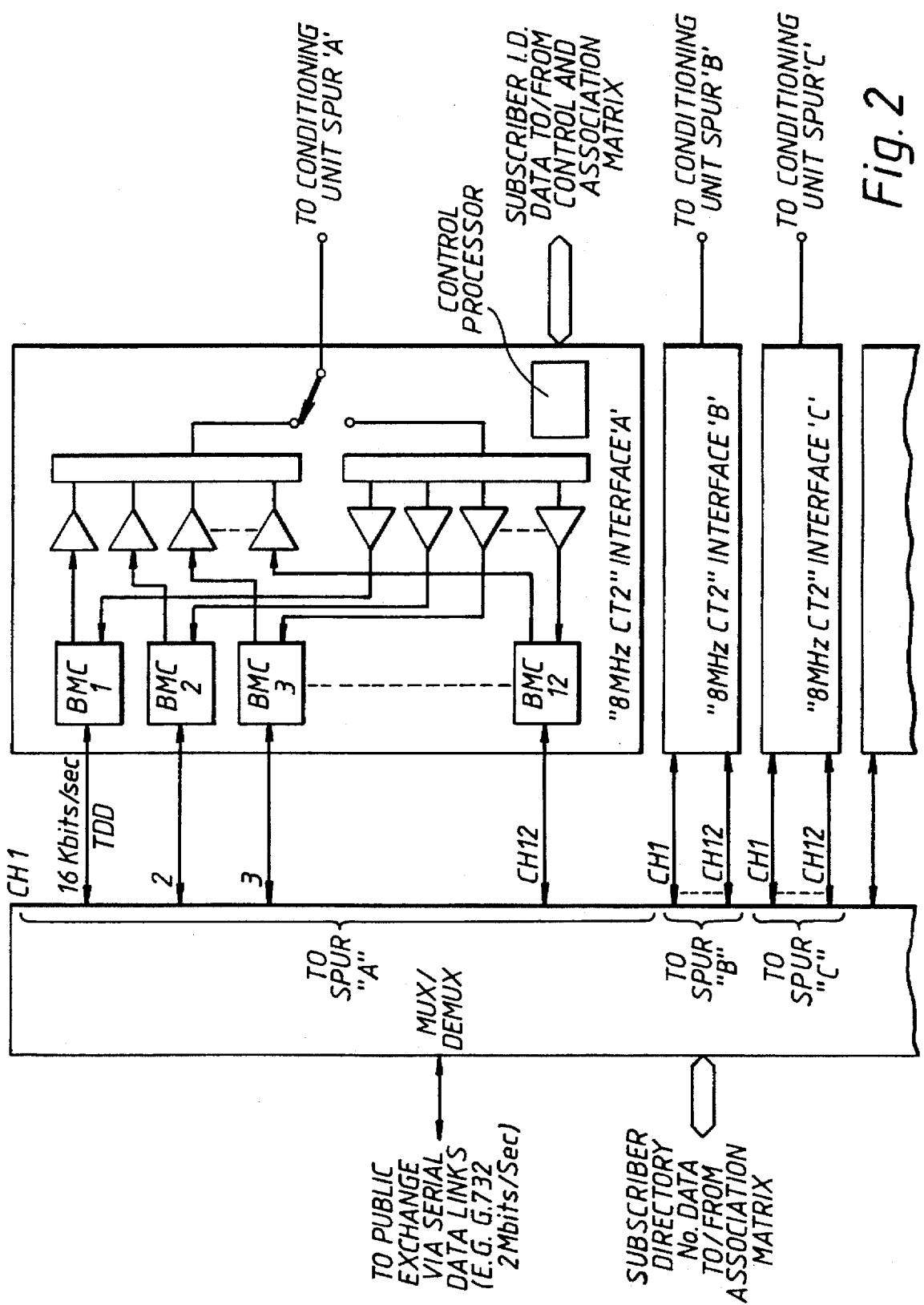
FIG. 2 is a block schematic diagram of a MUX/DEMUX and 8 MHz CT2 interface which forms a part of the system of the present invention shown in FIG. 1.
Figure 3A:
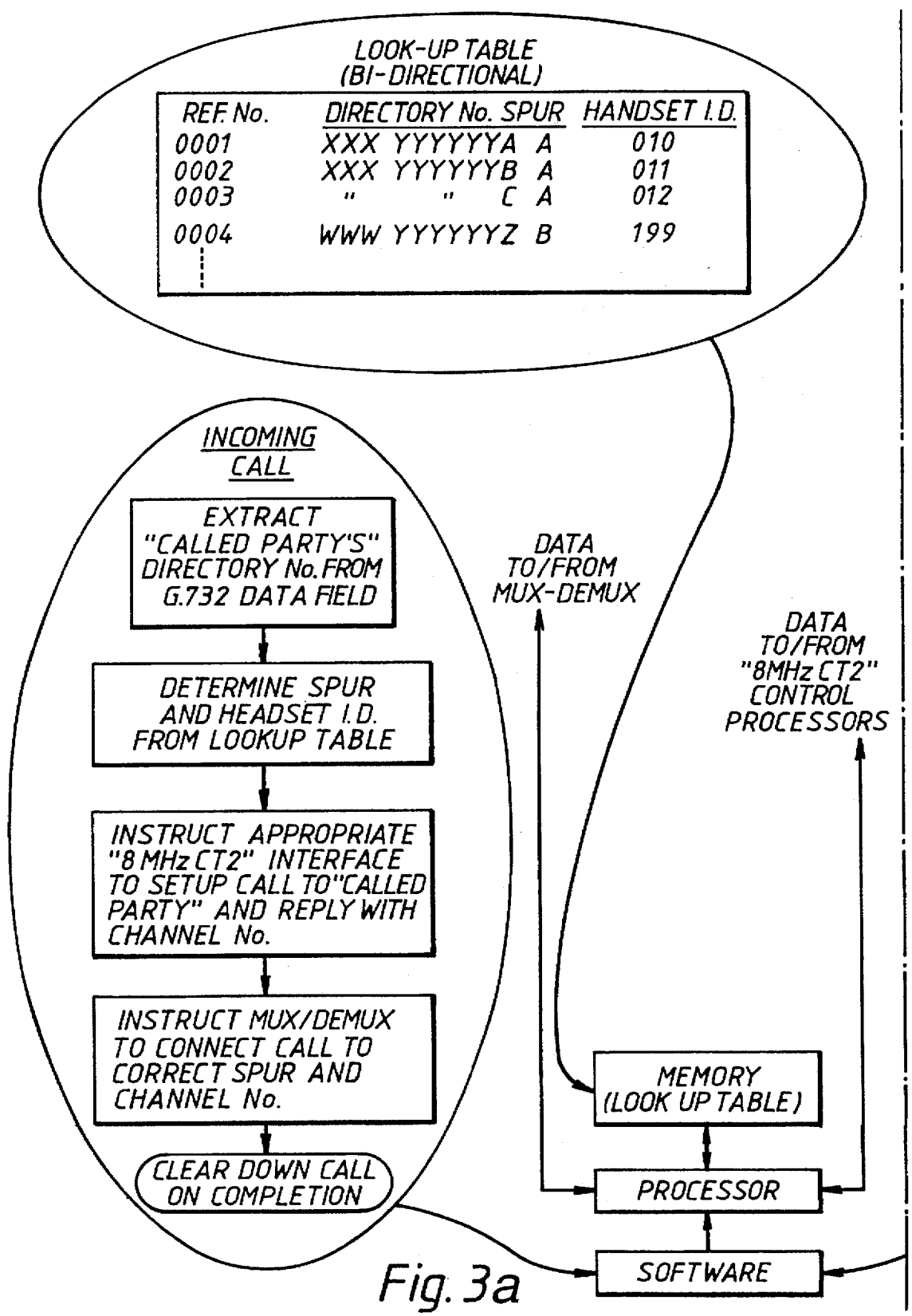
FIGS. 3a and 3b depict a block schematic/flow diagram illustrative of the functionality of a control and association matrix which forms a part of the system of the present invention shown in FIG. 1.
Figure 3B:
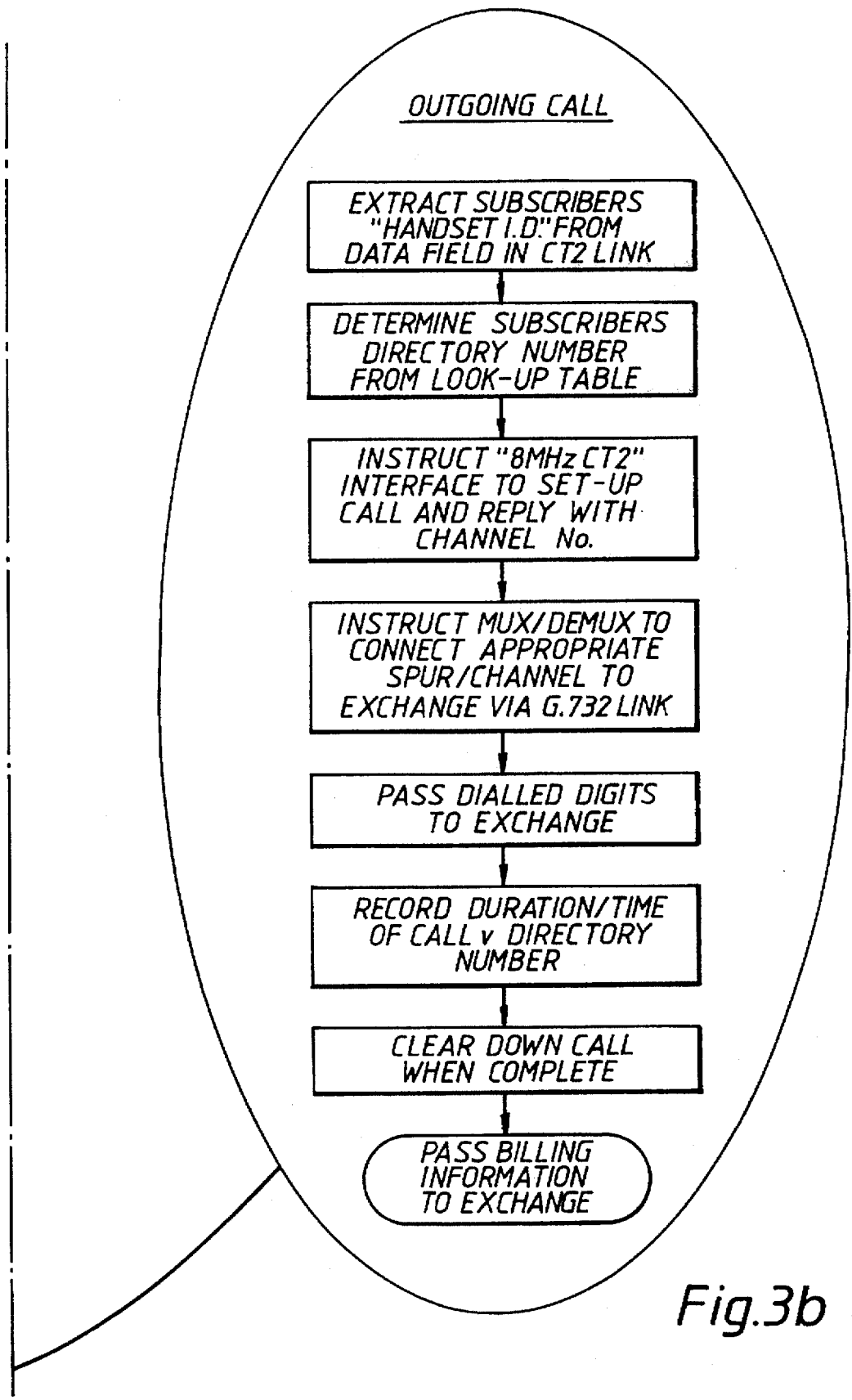

FIG. 2 is provided to facilitate a better understanding of the manner of operation of the system. The MUX/DEMUX and 8 MHZ CT2 interface unit 22 are shown in detail in FIG. 2, and the control and association matrix 21 is shown in detail in FIG. 3. These are required to ensure that incoming calls from the PSTN are routed to the correct subscriber and that the correct subscriber is billed for each outgoing call. The operation and construction of these arrangements will be fully appreciated from the drawings by those skilled in the art and further explanation of their functionality is therefore believed to be unnecessary.

It will be readily appreciated that using CT2 protocol, for example, the CT2 radio base station unit 18 can serve up to 150 domestic subscribers. Since all subscribers are not likely to be using the system at any one time, 150 public telephone exchange lines need not be provided by the public exchange switch network 15. In fact, in order to provide a reasonable service, as few as 12 to 15 lines may be all that is required in order to facilitate the provision of a reasonable service level.

If the electricity sub-station 14 were arranged to feed electricity to a large number of consumers, it may be required to provide telephone services for more than 150 domestic units which could be the limit of a single CT2 base station unit. In order to satisfy this requirement, however, it would be possible to operate two or more base stations in parallel, each of which would be arranged to use a different HF frequency band, and so if, for example, three different HF frequency bands were used, up to 450 telephone subscribers may be served via the electricity supply conductors associated with a common electricity sub-station.

It will be apparent that various modifications may be made to the arrangements hereinbefore described without departing from the scope of the invention and for example any other protocol may be used, which may or may not be a CT protocol and which may be adapted to provide services additional to voice communication services, such as data services as may be required for video systems for example.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A line communication system for linking a plurality of telephone subscribers to a public telephone exchange, wherein the subscribers are each located within a same general area, and wherein each subscriber is fed from the same mains electricity substation with mains electricity via mains electricity supply conductors, comprising:

subscriber apparatus including a cordless telephone (CT) handset and a frequency convertor for each subscriber, the handset being hard-wired to the mains electricity supply conductors via the frequency convertor so that CT signals at UHF are down-converted to HF for transmission through the mains electricity conductors;

a CT base station connected to the public telephone exchange, the CT base station connected to the mains electricity supply conductors via a further frequency convertor for HF line communication purposes; and a control matrix provided in operative association with the base station to associate an address corresponding to a telephone number for each subscriber as recognized by the public telephone exchange with corresponding channels assigned by the CT protocol to each subscriber wherein the public telephone exchange and the subscribers are placed in mutual two-way communication.

2. A line communication system as claimed in claim 1, wherein the respective frequency convertors used in the subscriber apparatus and in the base station are similar.

3. A line communication system as claimed in claim 1, wherein the CT handset and CT base station correspond to the Common Air Interface cordless telephone standard as specified by the European Telecommunications Standards Institute (ETSI) and known as CT2.

4. A line communication system as claimed in claim 1, wherein the CT handset and CT base station correspond to the Digital European Cordless Telephone (DECT) standard as specified by ETSI.

5. A line communication system as claimed in claim 1, wherein the CT base station is installed at an electricity substation remotely located from the subscribers.

6. A line communication system as claimed in claim 1, wherein the CT base station is located in close proximity to one of the subscribers.

7. A line communication system as claimed in claim 1, wherein a plurality of different HF frequency bands are used, one band for each of a plurality of different subscriber groups.

8. A line communication system as claimed in claim 7, wherein a plurality of base stations are used, each serving a different group of subscribers and each base station being arranged to use a different HF frequency band.

* * * * *